(12) United States Patent
Tuchimaa et al.

(10) Patent No.: US 8,734,211 B2
(45) Date of Patent: May 27, 2014

(54) AIRCRAFT PRESSURE MANAGEMENT SYSTEM

(75) Inventors: Clyde R. Tuchimaa, Lynnwood, WA (US); Susan D. Paish, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 1616 days.

(21) Appl. No.: 11/862,052

(22) Filed: Sep. 26, 2007

(65) Prior Publication Data

US 2009/0081937 A1    Mar. 26, 2009

(51) Int. Cl.
*B64D 13/02*    (2006.01)

(52) U.S. Cl.
USPC ............ 454/73; 454/70; 454/74; 454/75; 454/71; 454/72; 137/527; 137/511; 244/118.5

(58) Field of Classification Search
USPC ............. 454/70–76; 244/129.5, 129.4, 118.5
See application file for complete search history.

(56) References Cited

U.S. PATENT DOCUMENTS

| | | | |
|---|---|---|---|
| 3,387,804 A | | 6/1968 | Rhines |
| 3,426,984 A | * | 2/1969 | Emmons ............... 244/117 R |
| 3,571,977 A | | 3/1971 | Abeel |
| 4,390,152 A | * | 6/1983 | Jorgensen ............... 244/118.5 |
| 5,037,231 A | * | 8/1991 | Kitamura ............... 403/120 |
| 5,046,686 A | * | 9/1991 | Carla et al. ............... 244/118.5 |
| 5,069,401 A | | 12/1991 | Shepherd et al. |
| 5,259,576 A | * | 11/1993 | Howard ............... 244/129.5 |
| 5,704,207 A | | 1/1998 | Jensen et al. |
| 6,513,841 B1 | | 2/2003 | Jackson |
| 6,945,278 B2 | * | 9/2005 | Bunn et al. ............... 137/899.2 |
| 2005/0199845 A1 | * | 9/2005 | Jones et al. ............... 251/129.06 |
| 2006/0065308 A1 | * | 3/2006 | Rogge ............... 137/527 |
| 2012/0125010 A1 | * | 5/2012 | Michael et al. ............... 60/782 |

FOREIGN PATENT DOCUMENTS

EP    1787908 A2 *   5/2007

OTHER PUBLICATIONS

11862052—STIC—SearchResults.*
International Search Report dated Feb. 2, 2009 for International Application No. PCT/US2008/074072, 12 pages.

* cited by examiner

*Primary Examiner* — Kang Hu
*Assistant Examiner* — Nathaniel Herzfeld
(74) *Attorney, Agent, or Firm* — Klintworth & Rozenblat IP LLC (57) ABSTRACT

One embodiment of a pressure management system for an aircraft may include a cavity, an opening in a surface of the cavity, and a moveable door. An interior area within the cavity may have an interior pressure and an exterior area outside of the cavity may have an exterior pressure. The door may open to uncover the opening and may close to cover the opening in response to pressure differential between the exterior pressure and the interior pressure.

21 Claims, 10 Drawing Sheets

AIRCRAFT PRESSURE MANAGEMENT SYSTEM

BACKGROUND

Aircraft typically have varying interior pressure within the aircraft than outside of the aircraft. In the aircraft wing-to-body fairing, blowout doors or blowout panels are often utilized. The blowout doors and/or blowout panels blowout whenever there is an over-pressurization within the fairing. However, these blowout doors and/or blowout panels often need to be reset or replaced whenever an over-pressurization condition occurs in the fairing. Because of the need to replace panels and/or reset doors after blowout, blowout doors and/or panels are typically set to deploy at rather high pressures causing high stresses and increased component weights on fairing support structure and panels. Higher fairing cavity pressures may contribute to the possibility of panels leaving the airplane in flight which is a potential hazard to the airplane and to objects on the ground.

A pressure management system for an aircraft and/or method of managing pressure is needed to decrease one or more problems associated with one or more of the existing pressure management systems and/or methods.

SUMMARY

In one aspect of the disclosure, a pressure management system for an aircraft comprises a cavity, an opening in a surface of the cavity, and a moveable door. An interior area within the cavity has an interior pressure and an exterior area outside of the cavity has an exterior pressure. The door opens to uncover the opening and closes to cover the opening in response to pressure differential between the exterior pressure and the interior pressure.

In another aspect of the disclosure, a method of managing pressure in an aircraft is disclosed. In one step, a door is provided covering an opening in a surface of a cavity of the aircraft. In another step, the door is opened to uncover the opening when there is a pressure differential of a pre-determined amount between an interior pressure within the cavity and an exterior pressure outside of the cavity. In still another step, the door is closed to cover the opening when the pressure differential drops below the pre-determined amount.

In still another aspect of the disclosure, a method of selecting a position of a moveable door to manage pressure in an aircraft is disclosed. In one step, a pressure field distribution around the aircraft is determined. In another step, the position of the moveable door is selected to be at a location with a lowest pressure differential between an exterior pressure and an interior pressure of the aircraft.

These and other features, aspects and advantages of the disclosure will become better understood with reference to the following drawings, description and claims.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
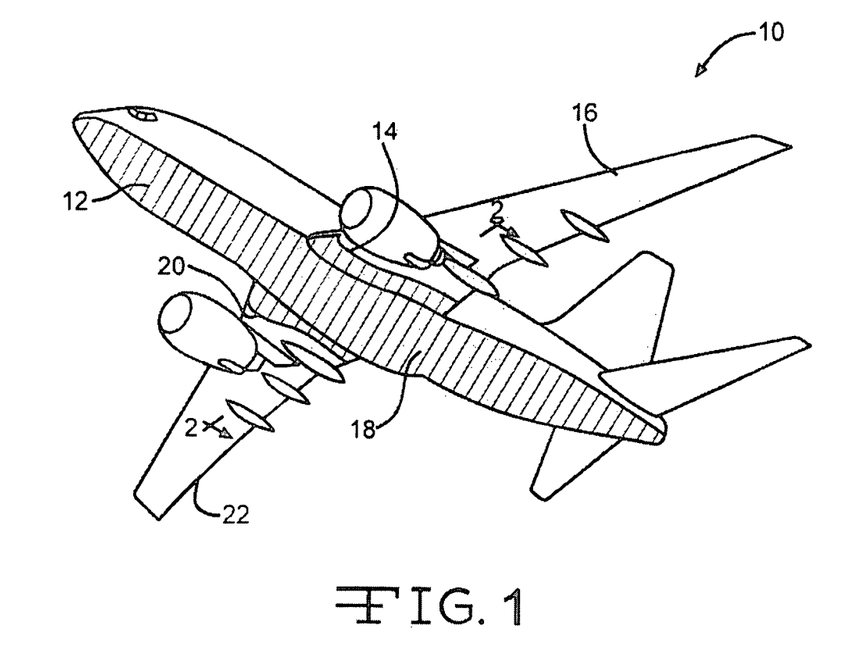
FIG. 1 shows a bottom perspective view of one embodiment of an aircraft having a wing-to-body fairing to which one embodiment of a pressure management system under the disclosure may be applied to manage pressure in the aircraft.

FIG. 1 shows a bottom perspective view of one embodiment of an aircraft 10 having a wing-to-body fairing 12 to which one embodiment of a pressure management system under the disclosure may be applied to manage pressure in the aircraft 10. As shown, the wing-to-body fairing 12 may extend from a portion 14 of one wing 16, over the bottom surface 18 of the aircraft 10, to a portion 20 of the other wing 22.

Figure 2:
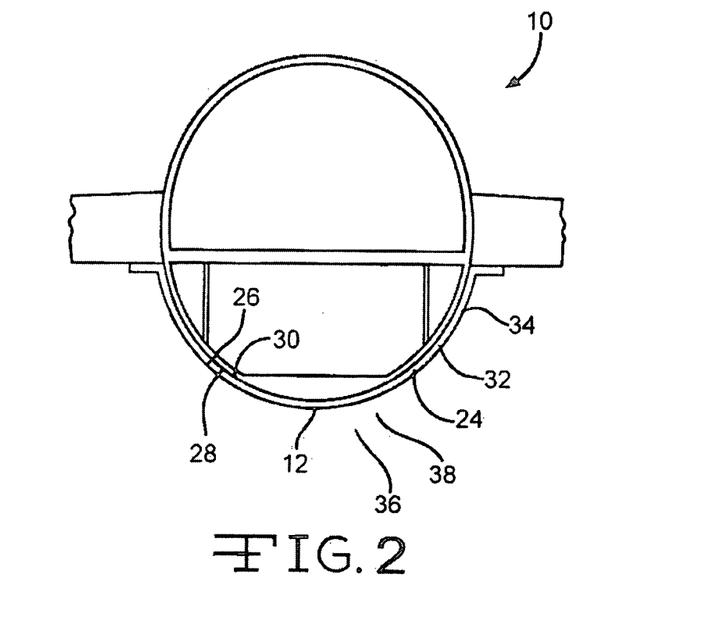
FIG. 2 shows a partial cross-sectional view through line 2-2 of FIG. 1 showing a cavity of the wing-to-body fairing to which one embodiment of the pressure management system of the disclosure may be applied.

FIG. 2 shows a partial cross-sectional view through line 2-2 of FIG. 1 showing a cavity 24 of the wing-to-body fairing 12 to which one embodiment of the pressure management system of the disclosure may be applied. As shown, the cavity 24 of the wing-to-body fairing 12 may be disposed between an interior surface 26 of the wing-to-body fairing 12 and an exterior surface 28 of the fuselage 30 of the aircraft 10. The cavity 24 of the wing-to-body fairing 12 may have an interior area 32 within the cavity 24 which has an interior pressure 34. An exterior area 36 outside of the wing-to-body fairing 12 may have an exterior pressure 38. The exterior area 36 may comprise atmospheric air outside of the aircraft 10 during flight. The exterior pressure 38 of the exterior area 36 outside of the wing-to-body fairing 12 may be greater or less than the interior pressure 34 within the interior area 32 within the cavity 24 of the wing-to-body fairing 12.

Figure 3:
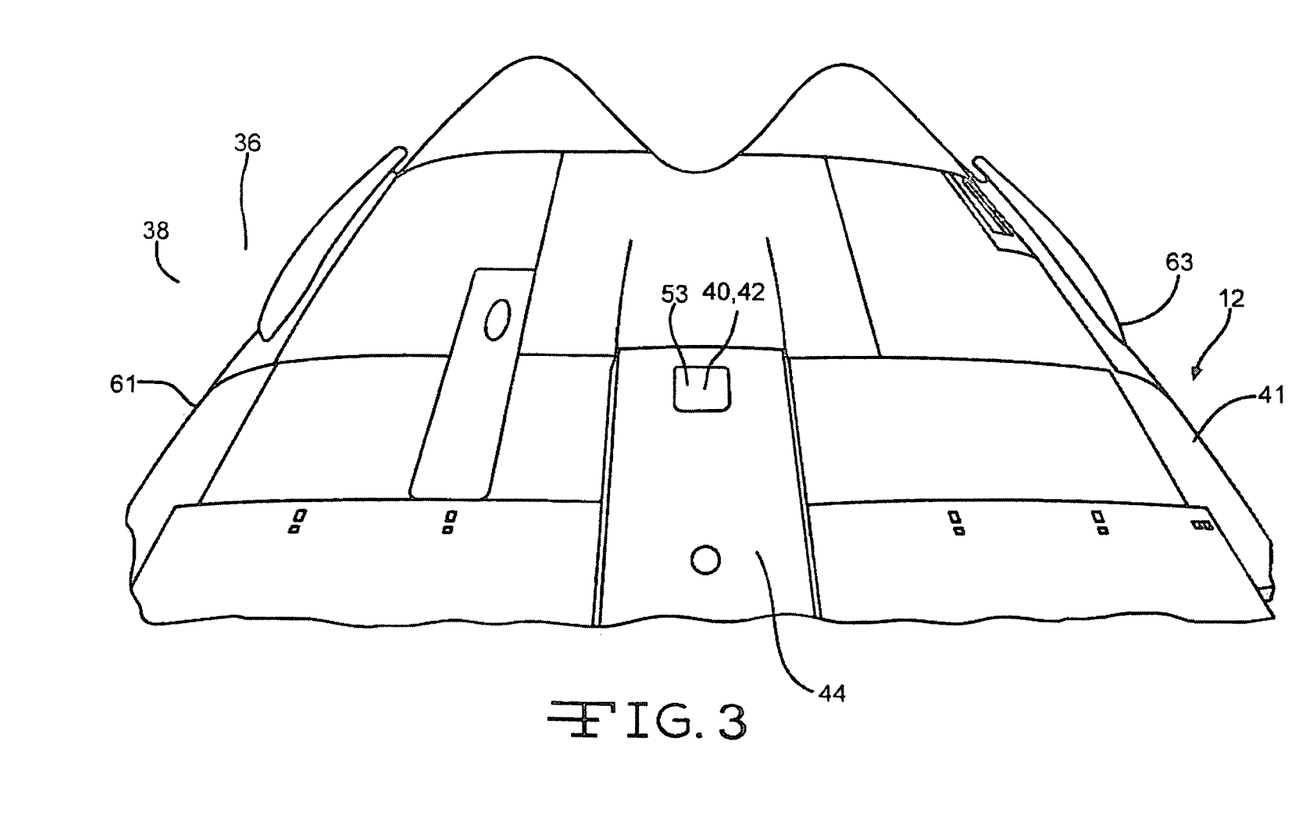
FIG. 3 shows a partial bottom view of the wing-to-body fairing of FIGS. 1 and 2 separated from the aircraft.
Figure 4:
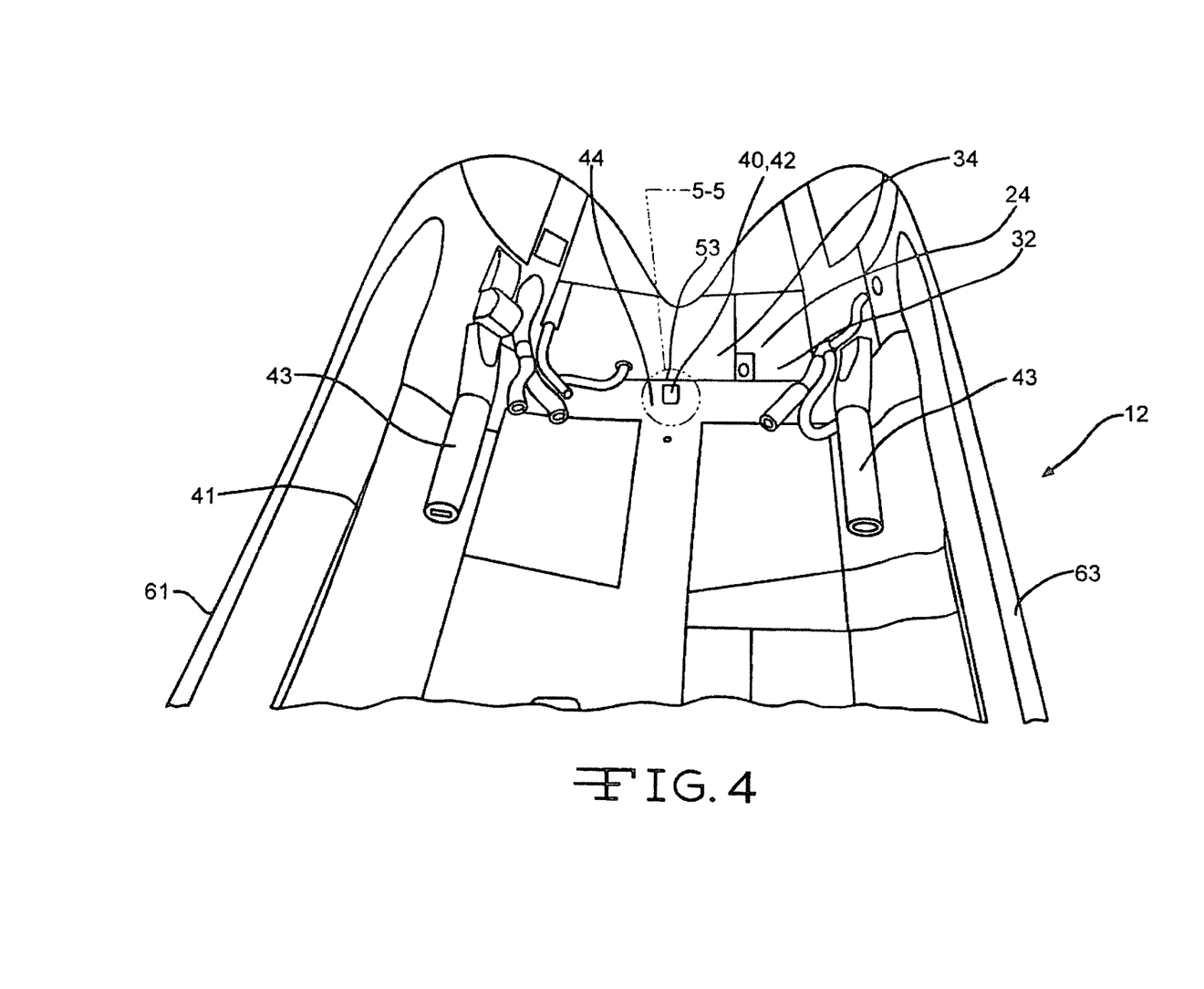
FIG. 4 shows a partial top view of the wing-to-body fairing of FIG. 3, showing some of the components attached within the wing-to-body fairing; such as air intake ducts.

FIG. 3 shows a partial bottom view of the wing-to-body fairing 12 of FIGS. 1 and 2 separated from the aircraft 10. FIG. 4 shows a partial top view of the wing-to-body fairing 12 of FIG. 3, showing some of the components attached within the wing-to-body fairing 12 such as air intake ducts 43. The wing-to-body fairing 12 of FIGS. 3 and 4 may comprise a forward/mid portion 41 of the wing-to-body fairing 12, which may comprise substantially the front half portion of the aircraft 10, not including the wheel well cavity (not shown), and the aft cavity (not shown) of the aircraft 10. As shown in FIGS. 3 and 4, under one embodiment of the disclosure, a pressure management system 40 may be attached to the wing-to-body fairing 12. The pressure management system 40 may comprise a moveable door 42 attached to a panel 44 of the wing-to-body fairing 12 which is adapted to open and close in response to pressure differential between the exterior pressure 38 and the interior pressure 34 in order to manage the pressure within the cavity 24 of the wing-to-body fairing 12. For instance, the moveable door 42 may open when a duct 43 burst within the fairing creates a large pressure differential between the exterior pressure 38 and the interior pressure 34. The moveable door may also open during envelope maneuvers of the aircraft 10 which may result in a bursting cavity pressure, and during other flight conditions.

Figure 5:
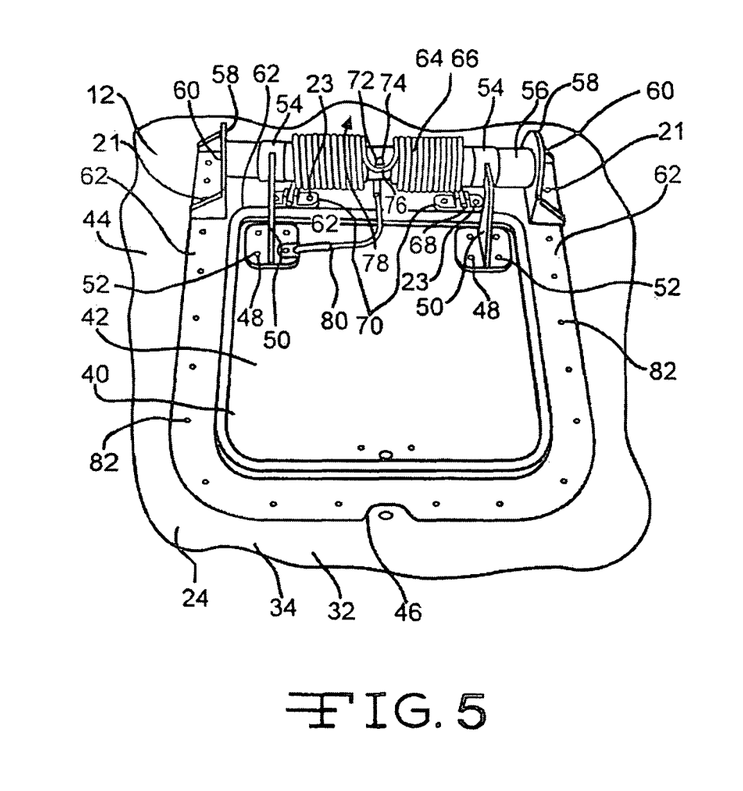
FIG. 5 shows a close-up top view within circle 5-5 of the embodiment of FIG. 4 in order to better show the moveable door of the pressure management system attached to the wing-to-body fairing.
Figure 6:
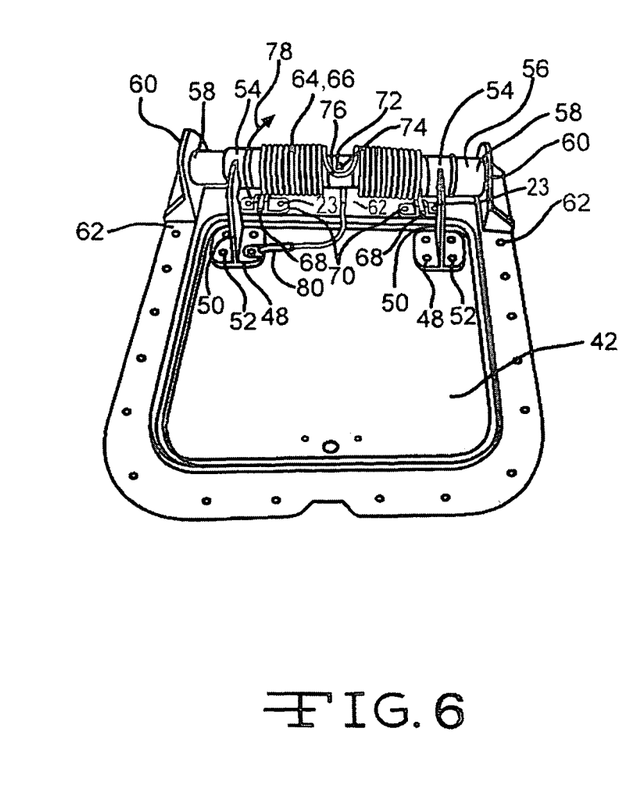
FIG. 6 shows a top view of the moveable door of FIG. 5 separated from the wing-to-body fairing.
Figure 7:
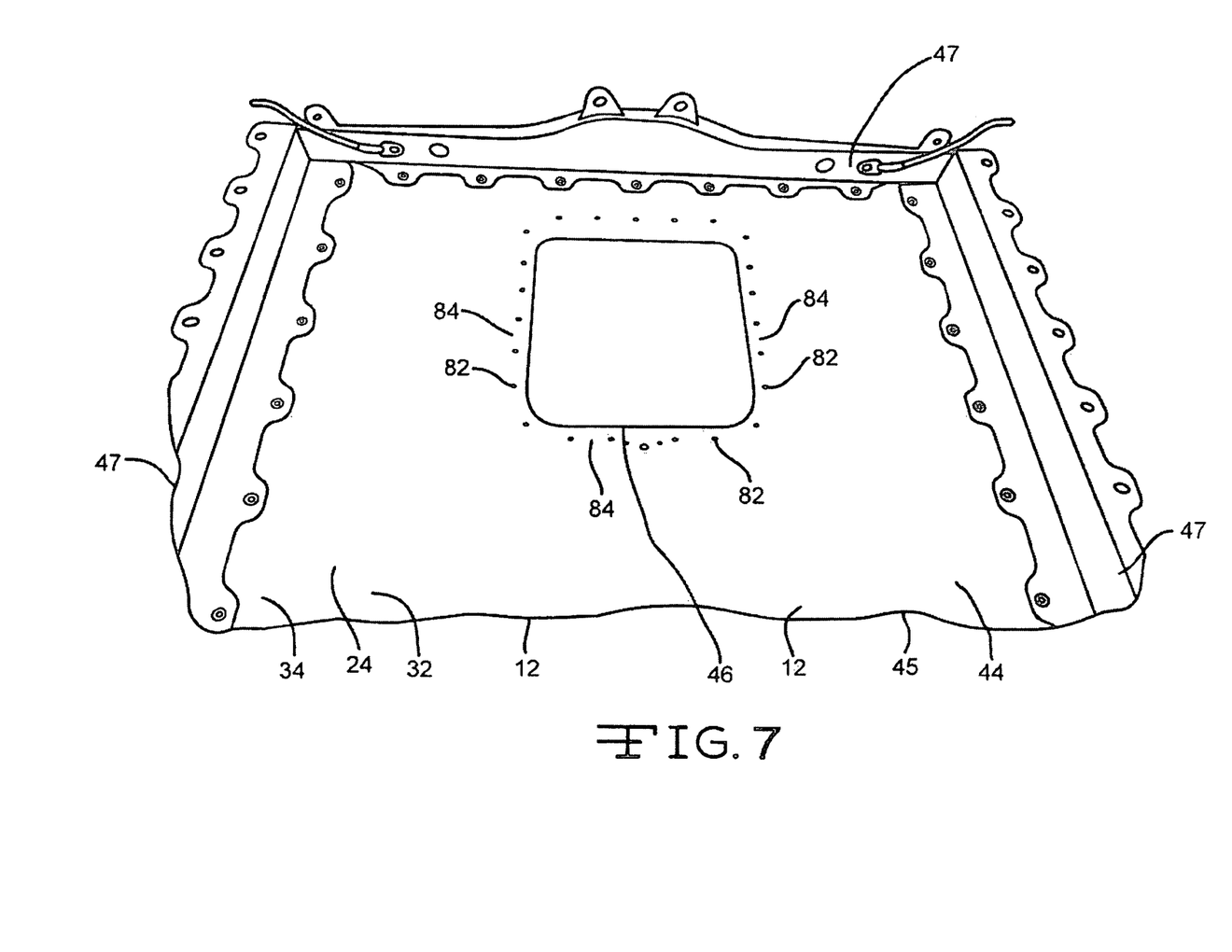
FIG. 7 shows a partial top view of the panel of the wing-to-body fairing of the embodiment of FIG. 4 with the moveable door separated from the panel to show an opening in the panel.

FIG. 5 shows a close-up top view within circle 5-5 of the embodiment of FIG. 4 in order to better show the moveable door 42 of the pressure management system 40 attached to the wing-to-body fairing 12. FIG. 6 shows a top view of the moveable door 42 of FIG. 5 separated from the wing-to-body fairing 12. FIG. 7 shows a partial top view of the panel 44, comprising a surface 45 of the cavity 24, of the wing-to-body fairing 12 of the embodiment of FIG. 4 with the moveable door 42 separated from the panel 44 to show an opening 46 in the panel 44. The moveable door 42 shown in FIGS. 5 and 6 may cover and uncover the opening 46, shown in FIG. 7, in the panel 44 of the fairing 12 in response to differential pressure between the exterior pressure 38 outside the cavity 24 and the interior pressure 34 inside the cavity 24. The panel 44 may be attached to frame members 47 of the wing-to-body fairing 12.

As shown in FIGS. 5-6, ends 48 of hinges 50 may be attached to the moveable door 42 by bolts 52 or through other attachment mechanisms. Circular ends 54 of the hinges 50 may be fixedly attached to rotate-able shaft 56, so that the moveable door 42 may pivotally rotate with rotation of the connected rotate-able shaft 56. Ends 58 of the shaft 56 may be rotate-ably attached to brackets 60 which are attached to a door frame 62 through bolts 21 or through other attachment mechanisms. A biasing member 64, which may comprise a spring 66 or other biasing mechanism, may be disposed over the shaft 56. Ends 68 of the biasing member 64 may be attached by brackets 70 to the door frame 62 through bolts 23 or other attachment mechanisms. A pin 72 extending through a hole 74 in the shaft 56 may be disposed against a looped portion 76 of the biasing member 64. The biasing member 64 may bias the door 42 towards the closed position covering the opening 46 in the panel 44 by the looped portion 76 of the biasing member 64 abutting against and biasing the pin 72 of the shaft 56 to rotate in direction 78. A ground static member 80 may be attached between the hinge 50 and the door frame 62.

As shown in FIGS. 5-7, the door frame 62, to which the moveable door 42 is attached, may be bolted using bolts 82 around a periphery 84 of the opening 46 in the panel 44. In such manner, the moveable door 42 may be attached to the wing-to body fairing 12.

Figure 8:
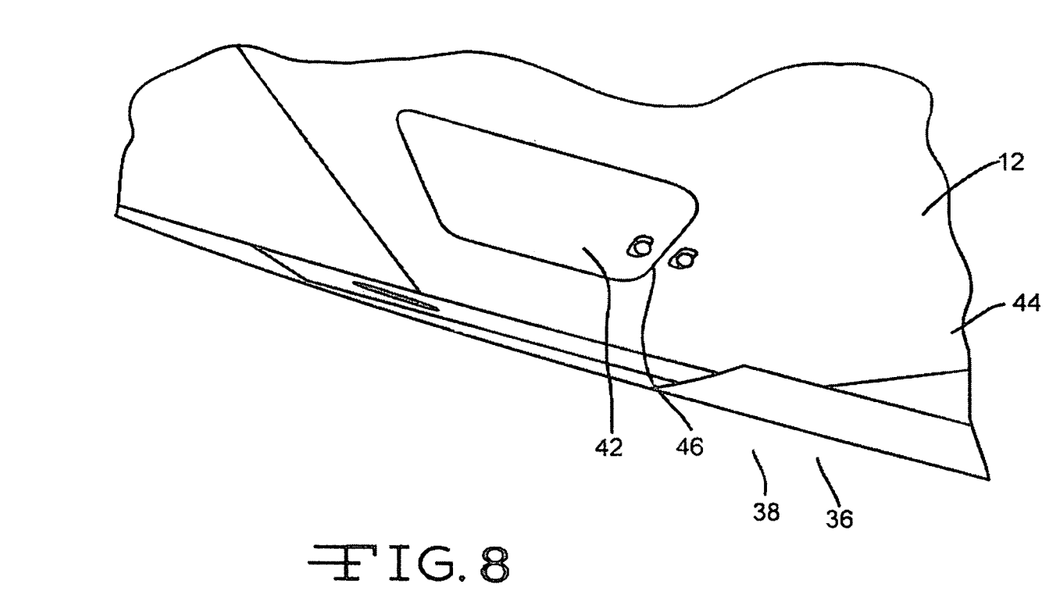
FIG. 8 shows a close-up bottom perspective view of the moveable door of the embodiment of FIG. 3 in a closed position covering the opening in the panel of the wing-to-body fairing.

FIG. 8 shows a close-up bottom perspective view of the moveable door 42 of the embodiment of FIG. 3 in a closed position covering the opening 46 in the panel 44 of the wing-to-body fairing 12. The moveable door 42 may be in the closed position of FIG. 8 when the pressure differential between the exterior pressure 38 outside the cavity 24 and the interior pressure 34 inside the cavity 24 is below a pre-determined amount. In one embodiment, the pre-determined amount may be substantially zero pressure. The moveable door 42 may be in a closed position when there is substantially no net pressure difference (a substantially zero pressure differential) between the exterior pressure 38 outside of the cavity 24 and the interior pressure 34 within the cavity 24.

Figure 9:
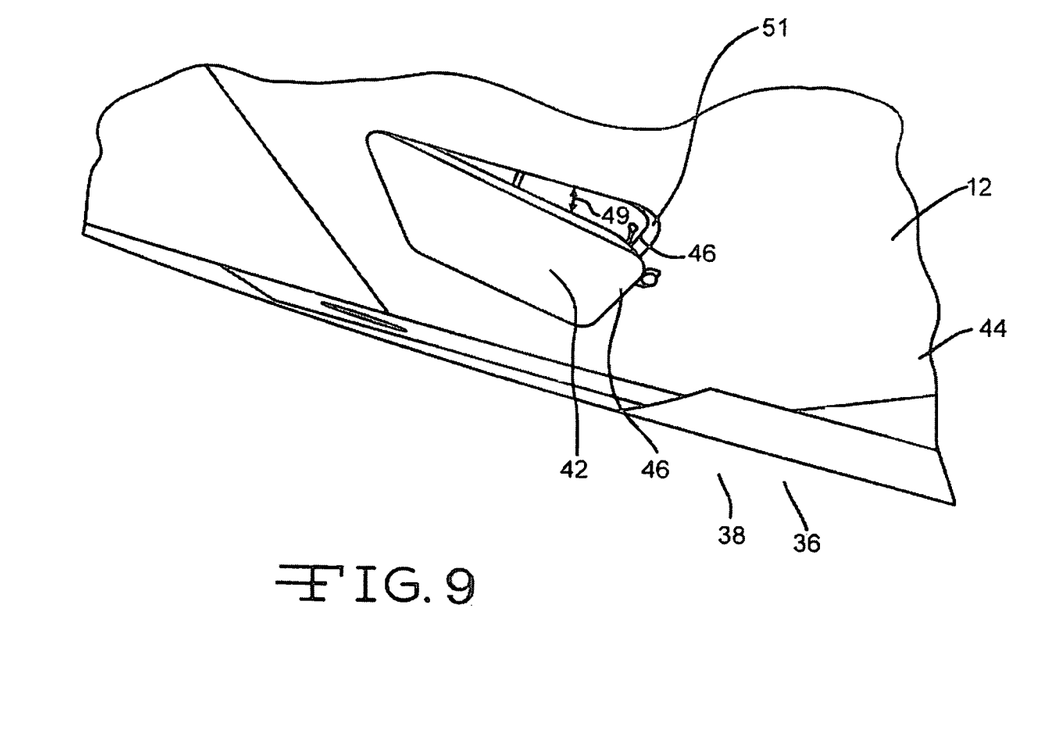
FIG. 9 shows a close-up bottom perspective view of the moveable door of the embodiment of FIG. 8 in an open position uncovering the opening in the panel of the wing-to-body fairing.

FIG. 9 shows a close-up bottom perspective view of the moveable door 42 of the embodiment of FIG. 8 in an open position uncovering the opening in the panel 44 of the wing-to-body fairing 12. The moveable door 42 may open at a trailing edge 47 of the aircraft 10 in order to reduce drag on the aircraft 10. The moveable door 42 may be in the open position of FIG. 9 when the pressure differential between the exterior pressure 38 outside of the cavity 24 and the interior pressure 34 inside the cavity 24 is greater than or equal to a pre-determined amount. In one embodiment, the pre-determined amount may be substantially zero pressure, and the moveable door 42 may open when the interior pressure 34 within the cavity 24 is greater than the exterior pressure 38 outside of the cavity 24. In another embodiment, the moveable door 42 may open when the pressure differential is substantially greater than zero. In one embodiment, when the moveable door 42 is fully open, such as during a duct burst 43 within the wing-to-body fairing 12, the angle 49 between the moveable door 42 and the panel 44 of the wing-to-body fairing 12 may be substantially ten degrees. In another embodiment, the angle 49 may be substantially in a range of one to thirty degrees.

As shown in FIGS. 3 and 4, the pressure management system 40 may be located at a substantially center area 53 of the wing-to-body fairing 12 of the aircraft 10. For instance, the pressure management system 40 may be located half-way between opposing sides 61 and 63 of the wing-to-body fairing 12. This area 53 may comprise an area 53 where the pressure differential between the exterior pressure 38 and the interior pressure 34 is substantially low, during at least one of cruise and normal operation, in order to reduce drag on the aircraft 10 and in order to minimize the amount of force to close the door 42.

Figure 10:
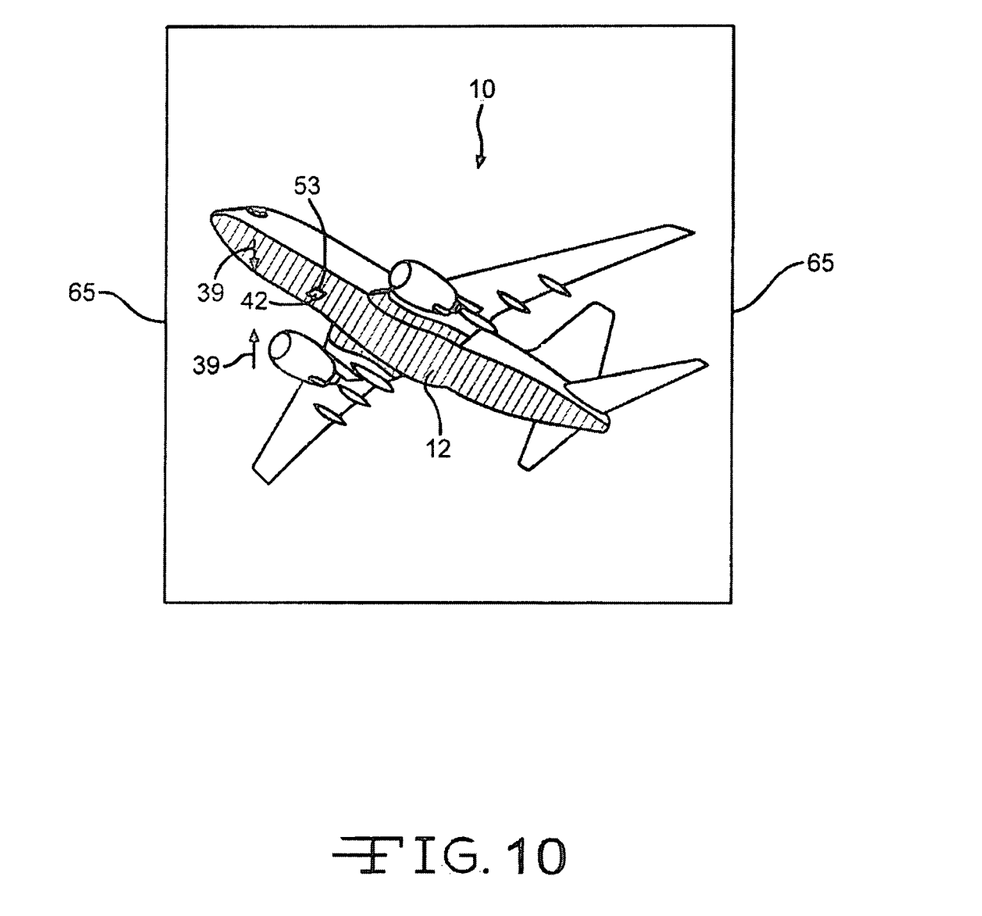
FIG. 10 shows the aircraft of FIG. 1 being disposed within a wind tunnel under one embodiment of the disclosure in order to determine the pressure distribution around the aircraft.

As shown in FIG. 10, which shows the aircraft 10 of FIG. 1 being disposed within a wind tunnel 65, the location of the substantially low pressure differential area 53 where the door 42 is located may have been selected by putting the aircraft 10 in the wind tunnel 65 to determine the pressure distribution 39 around the aircraft 10. The location of the low pressure differential area 53 for the door 42 may then have been determined by selecting the lowest pressure differential area 53 within the wing-to-body fairing 12 based on the data from the wind tunnel 65 testing of the aircraft 10.

Figure 11:
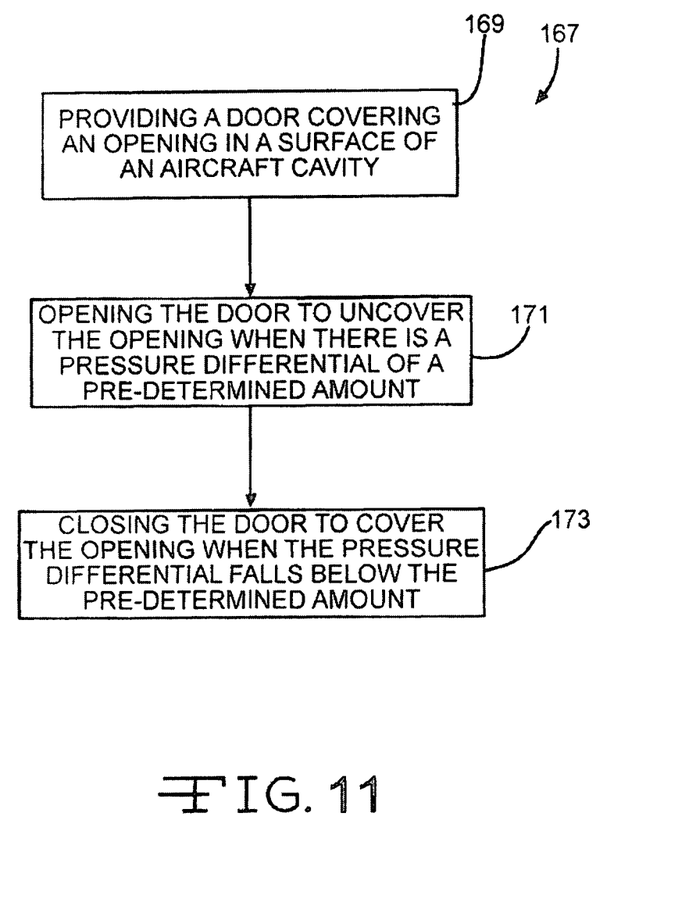
FIG. 11 shows a flowchart of one embodiment of a method of managing pressure in an aircraft.

FIG. 11 shows a flowchart of one embodiment of a method 167 of managing pressure in an aircraft 10, such as for managing the pressure within a forward/mid portion 41 of a wing-to-body fairing 12 of the aircraft 10. In one step 169, a door 42 is provided covering an opening 46 in a surface 45 of a cavity 24 of the aircraft 10. The door 42 may be pivotally attached to the wing-to-body fairing 12 using a spring loaded hinge 50. A biasing member 64, which may comprise a spring 66, may bias the door 42 to cover the opening 46. The door 42 may be located at an area 53 of the aircraft 10 where the pressure differential is substantially low. The door 42 may be located at a substantially center area 53 of a forward/mid portion 41 of a wing-to body fairing 12.

In another step 171, the door 42 is opened to uncover the opening 46 when there is a pressure differential of greater than or equal to a pre-determined amount between an interior pressure 34 within the cavity 24 and an exterior pressure 38 outside of the cavity 24. In one embodiment, the door 42 may open to uncover the opening 46 when the pressure differential is greater than zero. In another embodiment, the door 42 may open at a trailing edge 47 of the aircraft 10. In yet another embodiment, the door 42 may open substantially in a range of one to thirty degrees. In still another step 173, the door 42 may be closed to cover the opening 46 when the pressure differential drops below the pre-determined amount.

Figure 12:
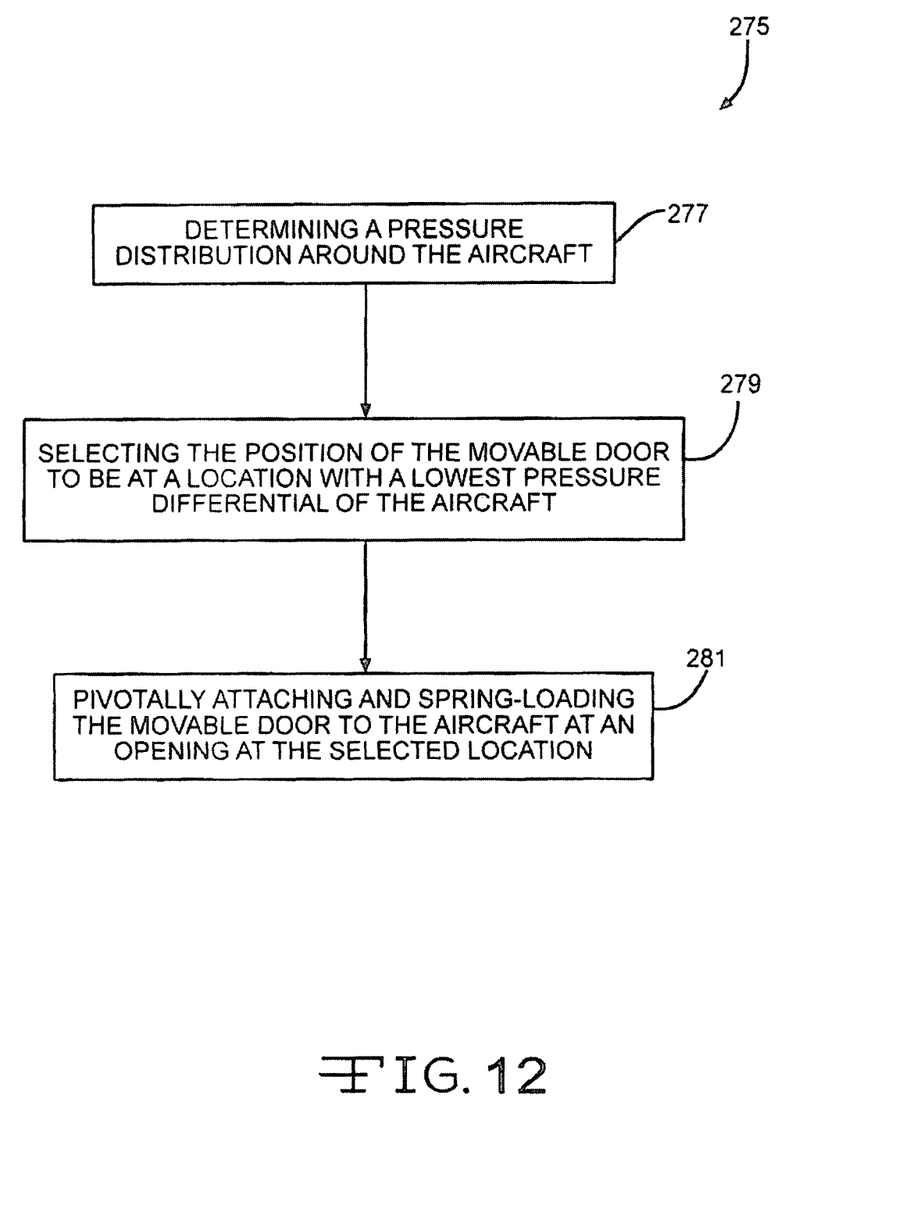
FIG. 12 shows a flowchart of one embodiment of a method of selecting a position of a moveable door to manage pressure in an aircraft.

FIG. 12 shows a flowchart of one embodiment of a method 275 of selecting a position of a moveable door 42 to manage pressure in an aircraft 10. The method 275 may be used to select the position of a moveable door 42 in a wing-to-body fairing 12 of the aircraft 10. In one step 277, a pressure distribution 39 is determined around the aircraft 10. The pressure distribution 39 around the aircraft 10 may be determined utilizing testing in a wind tunnel 65. In another step 279, the position of the moveable door 42 is selected to be at a location 53 with a lowest pressure differential between an exterior pressure 38 and an interior pressure 34 of the aircraft 10. In still another step 281, the moveable door 42 may be pivotally attached and spring-loaded to the aircraft 10 at an opening 46 at the location 53. The moveable door 42 may open to uncover the opening 46 when the pressure differential is greater than or equal to a pre-determined amount, and the door 42 may close to cover the opening 46 when the pressure differential drops below the pre-determined amount.

One or more embodiments of the disclosure may reduce and/or eliminate one or more of the problems associated with one or more of the existing pressure management systems and/or associated methods. For instance, one or more embodiments of the disclosure may provide a pressure management system which is lighter, more maintenance friendly, experiences less drag, lessens the amount of force required to close the door, lowers the peak duct burst pressure, vents pressure during corner of the envelope maneuvers which may result in a bursting cavity pressure thereby reducing some of the ultimate maneuver net air loads, lessens the likelihood of injury to someone on the ground due to blowout of the panel and/or door, and/or may reduce one or more other types of problems of one or more of the existing pressure management systems and/or associated methods.

It should be understood, of course, that the foregoing relates to exemplary embodiments of the disclosure and that modifications may be made without departing from the spirit and scope of the disclosure as set forth in the following claims.

The invention claimed is:

1. A pressure management system of an aircraft comprising:
    a cavity, wherein an interior area within the cavity has an interior pressure and an exterior area outside of the cavity has an exterior pressure;
    an opening in a surface of said cavity, the opening located in the aircraft where a pressure differential between the exterior pressure and the interior pressure is determined to be lowest during a portion of cruise;
    a moveable door moveably attached to the surface of said cavity with a hinge, wherein the moveable door is configured to passively open to uncover the opening and passively close to cover the opening in response to the pressure differential; and
    a biasing member biasing the hinge to cover the opening with the moveable door attached to the hinge.

2. The pressure management system of claim 1 wherein the surface comprises a wing-to-body fairing of the aircraft.

3. The pressure management system of claim 2 wherein the cavity is disposed between the wing-to-body fairing and a fuselage of the aircraft.

4. The pressure management system of claim 3 wherein the exterior area is outside of the aircraft.

5. The pressure management system of claim 1 wherein the hinge comprises a rotatable shaft attached to the surface of said cavity and to the moveable door with brackets.

6. The pressure management system of claim 1 wherein the moveable door opens to uncover the opening when the pressure differential is greater than or equal to a pre-determined amount and closes to cover the opening when the pressure differential is less than the pre-determined amount.

7. The pressure management system of claim 6 wherein the pre-determined amount of the pressure differential is zero and the moveable door opens to uncover the opening when the pressure differential is greater than zero and closes to cover the opening when the pressure differential is zero.

8. The pressure management system of claim 1 wherein there is only one biasing member.

9. The pressure management system of claim 5 wherein the biasing member is disposed around the shaft.

10. The pressure management system of claim 9 wherein the biasing member is attached to the surface of said cavity with a bracket and the biasing member is abutted against a pin of the shaft biasing the pin of the shaft.

11. The pressure management system of claim 1 wherein the biasing member comprises a spring.

12. The pressure management system of claim 1 wherein said moveable door opens ten degrees when the moveable door is fully open.

13. The pressure management system of claim 1 wherein said moveable door opens in a range of one to thirty degrees when the moveable door is fully open.

14. The pressure management system of claim 1 wherein the opening is located at a center area of a forward/mid portion of a wing-to-body fairing of the aircraft.

15. The pressure management system of claim 1 further comprising a door frame attached to the surface over the opening, wherein the hinge is attached to the door frame thereby moveably attaching the moveable door to the door frame over the opening.

16. A pressure management system of an aircraft comprising:
    a door frame comprising an opening, the opening located in the aircraft where a pressure differential between an exterior pressure and an interior pressure is determined to be lowest during a portion of cruise;
    a hinge attaching a moveable door to the door frame, wherein the moveable door is configured to passively open to uncover the opening and to passively close to cover the opening in response to the pressure differential; and
    a biasing member biasing the moveable door to cover the opening.

17. The pressure management system of claim 16 wherein the biasing member biases the hinge to cover the opening with the moveable door attached to the hinge.

18. The pressure management system of claim 16 wherein the biasing member comprises a spring.

19. The pressure management system of claim 16 further comprising a second opening in a wing-to-body fairing of the aircraft with the door frame attached over the second opening so that the moveable door passively opens to uncover both the opening and the second opening when the pressure differential between the exterior pressure outside the wing-to-body fairing and the interior pressure within the wing-to-body fairing is greater than or equal to a pre-determined amount.

20. The pressure management system of claim 16 wherein the hinge is directly attached to the door frame.

21. The pressure management system of claim 20 wherein the door frame comprises opposed top and bottom surfaces and opposed side surfaces attached to the opposed top and bottom surfaces to form a continuous perimeter, wherein the opening is disposed between the opposed top and bottom surfaces and between the opposed side surfaces within the continuous perimeter.

* * * * *

UNITED STATES PATENT AND TRADEMARK OFFICE
CERTIFICATE OF CORRECTION

PATENT NO.         : 8,734,211 B2
APPLICATION NO.    : 11/862052
DATED              : May 27, 2014
INVENTOR(S)        : Clyde R. Tuohimaa and Susan D. Paish It is certified that error appears in the above-identified patent and that said Letters Patent is hereby corrected as shown below:

On the Title Page:
        Item (12): Delete "Tuchimaa" and insert --Tuohimaa--.
        Item (75): Delete "Clyde R. Tuchimaa" and insert --Clyde R. Tuohimaa--.

Signed and Sealed this
Ninth Day of December, 2014

Michelle K. Lee
*Deputy Director of the United States Patent and Trademark Office*